Figure 1:
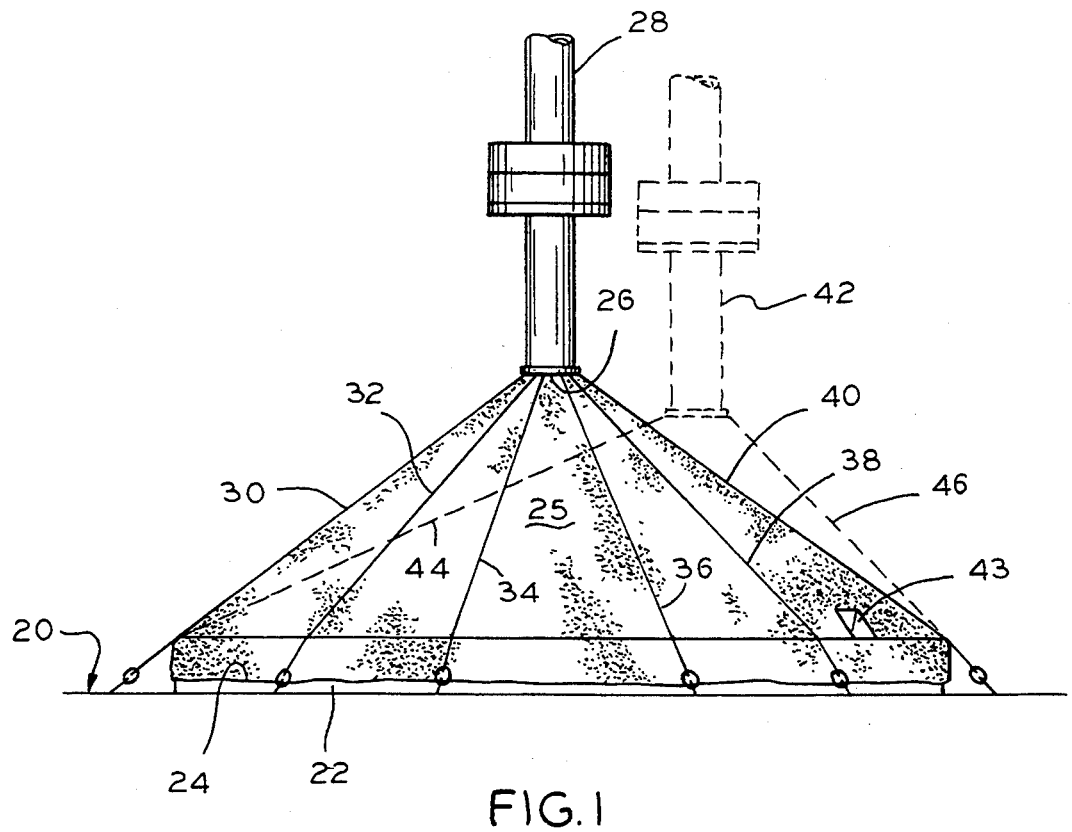

United States Patent [19]

Duffy et al.

[11] Patent Number: 5,427,491

[45] Date of Patent: Jun. 27, 1995

[54] HATCH COVER FOR LOADING PARTICULATE MATTER

[75] Inventors: Warren J. Duffy, Destrehan, La.; Paul L. Woijeck; James F. Voigt, both of Decatur, Ill.

[73] Assignee: Archer Daniels Midland Company, Decatur, Ill.

[21] Appl. No.: 9,121

[22] Filed: Jan. 26, 1993

[51] Int. Cl.⁶ ............................................ B65G 65/28
[52] U.S. Cl. ...................................... 414/291; 52/192; 406/171; 414/137.4
[58] Field of Search ................. 52/192, 193, 195, 197, 52/2.25, 2.26, 196; 414/291, 292, 293, 137.4; 135/100; 406/168, 171, 172, 175

[56] References Cited

U.S. PATENT DOCUMENTS

| | | | |
|---|---|---|---|
| 214,996 | 5/1879 | Doane | 135/100 |
| 3,181,543 | 5/1965 | Petrie | 135/100 |
| 4,130,125 | 12/1978 | Nivin | 414/137.4 |
| 4,248,277 | 2/1981 | Hanrot et al. | 414/291 |
| 4,454,807 | 6/1984 | Wolstenholme | 414/293 |
| 4,652,199 | 3/1987 | Pole | 414/291 |
| 4,750,733 | 6/1988 | Foth | 52/2.26 |
| 4,887,400 | 12/1989 | Carroll | 414/293 |
| 4,990,045 | 2/1991 | Araly | 414/292 |

*Primary Examiner*—Michael Safavi
*Attorney, Agent, or Firm*—Laff, Whitesel, Conte & Saret

[57] ABSTRACT

A hatch cover is a tent-like fabric structure having a skirt with dimensions which fit around and is attachable to a periphery of a hatch to keep foreign substances from falling into the hatch. Examples of such substances are rain, snow, dust, and any other contaminants. The fabric structure has a sloping roof rising from the skirt to a top where the fabric is sealed to a spout for delivering particulate matter into a space (such as the hold of a ship) under the fabric. A plurality of ropes extends around the periphery of the hatch to the top of the fabric, whereby the spout may be positioned and repositioned by changing the length of the tie-down ropes. The fabric structure may also be supported by creating a positive air pressure under the structure relative to ambient atmosphere pressure. Preferably the fabric structure is a generally conical structure with eaves at the base of the cone. At least one inflatable tube may be built into the hatch cover, preferably an eave of the flexible structure and at an elevation above the hatch.

11 Claims, 2 Drawing Sheets

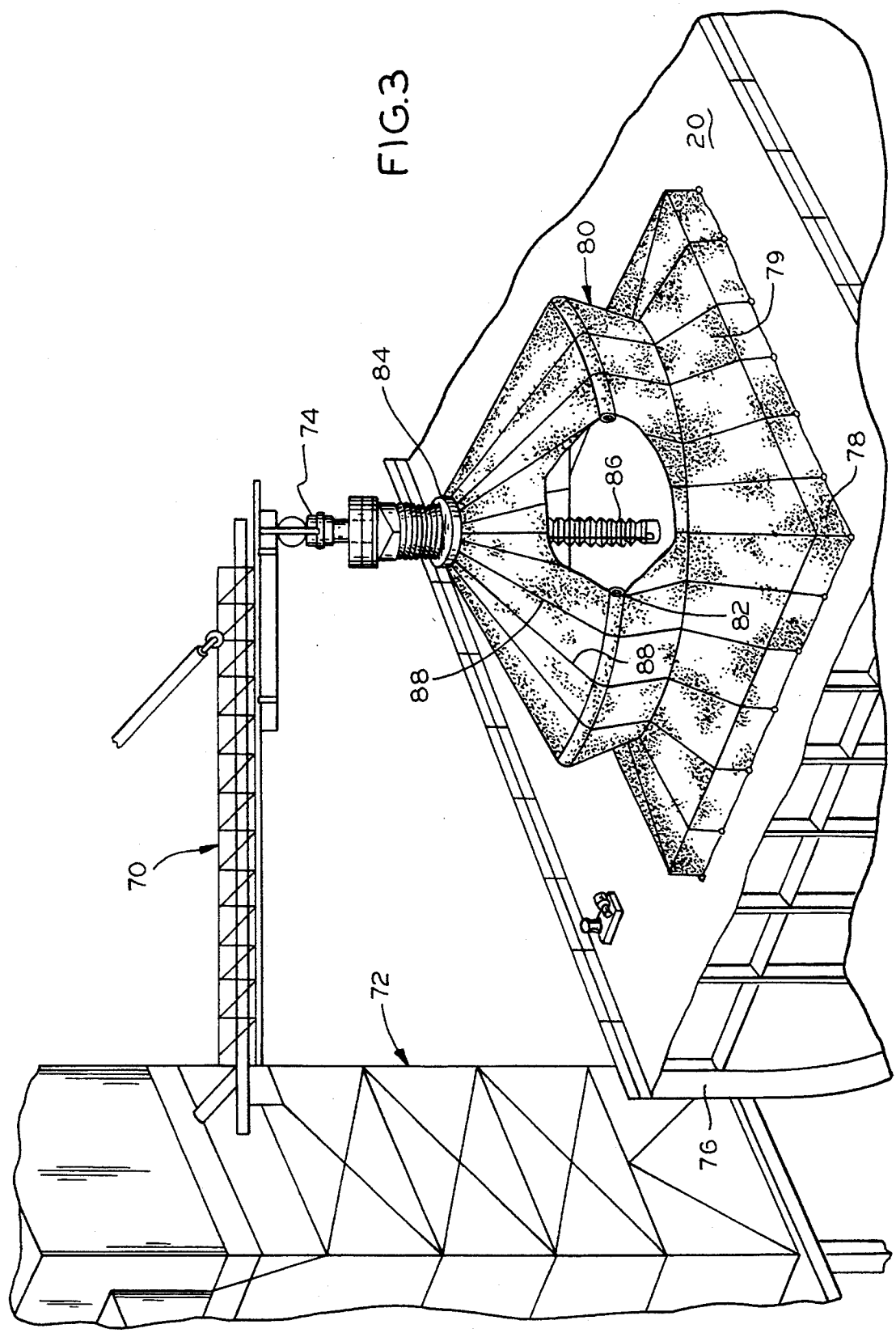

HATCH COVER FOR LOADING PARTICULATE MATTER

This invention relates to means for and methods of loading particulate matter - especially, but not exclusively grain--and more particularly to weather proof hatch covers for loading such particulate matter in all weather conditions.

The terms "grain" "grain spout" and the like, are used herein for convenience of expression and to facilitate a description of the invention. This particular terminology is not to be taken as a necessary limitation upon the invention. Likewise, the term "fabric" is used herein to describe a sheet material. However, the "fabric" may be any suitable material, such as woven of any suitable threads, canvas, plastic sheeting, or the like. The term "weather proof" is intended to cover any and all conditions when contaminants may fall through an open and unprotected hatch such as rain, snow, dust, soot, bird droppings, or the like.

Grain is an example of particulate matter which may be loaded with the help of the invention. Usually, grain is shipped in the holds of large vehicles such as ships or barges, for example. The hold has an open top hatch through which a spout may project in order to deliver grain from a silo or other storage device. This open top and grain delivery raises two problems. First, the grain is dusty and tends to create a dust laden atmosphere which is dangerous. Second, in inclement weather, during dust storms, etc. it has not been possible to load because the rain, snow, dirt, etc. will fall into the open hatch.

Conventionally, a grain delivery spout system includes a gravity fed pipe, with a relatively large cross sectional area which conveys a flowing stream of grain, or the like, from a source such as a silo. There are many different times and places where such a delivery spout system may be used. However, to explain a particular use of the invention and to highlight the problems of grain movement, it might be assumed that grain is carried by a conveyor belt to an elevated position where it is dumped into a funnel shaped structure, often called a "discharge spout". The grain runs under gravity out the bottom of the funnel or discharge spout and down a delivery spout system to the hold of a ship, barge, or other vehicle. There, the spout swings horizontally or telescopes to scan the hold, spreading the grain uniformly and keeping the vehicle in balance.

A flowing stream of grain has some of the characteristics of flowing water, analogous to the surging and boiling, tumbling and eddying of, say, a mountain stream. Much as such water activity gives off a spray or mist of water, the grain activity gives off dust. Therefore, the discharge end of the spout discharges not only the grain, but also a cloud of dust. For a number of reasons which are not important here, that cloud of dust has recently become a subject matter of great concern.

Another problem is that hatches on ships, barges, etc. are not a standardized shape or size. Therefore, some ships may have larger and others smaller hatch areas. A dedicated weather proof cover providing a suitable dust barrier or weather proof cover which may fit only one hatch may have only a very limited use and might make dock facilities unsuitable for loading more than one or a few types of ships. Therefore, any weather proof hatch cover should have dimensions which are flexible and adaptable enough to fit hatches having many different sizes and shapes.

Another problem is that the spout is conventionally moved to scan back and forth in order to provide an even and uniform loading. Economical delivery of grain requires the fastest flowing grain stream that may be reasonably possible. However, the spout cannot be loaded 100% full of grain because that eliminates all tolerance for fluctuation in the grain flow. For these, and many other reasons, most spouts run with their cross sections about one-quarter to one-third full, although this is not a critical factor. Therefore, any weather proof hatch cover should provide a maximum amount of spout movement and volume fluction without exposing the interior of the hatch to inclement weather or uneven loading.

Yet another problem relates to the ease of and time consumed in deploying and removing the weather proof hatch cover. Since most hatches on grain ships have a relatively large area, any weather proof hatch cover will be large and unwieldy. The desire is to have a roof which is self-supporting and which slopes sufficiently for all water to run off without collecting thereon.

Accordingly, an object of the invention is to provide new and improved means for and methods of loading particulate matter through large openings such as a hatch on a ship or other cargo vessel during inclement weather. Here, an object is to contain all dust under a weather proof cover and within the hold of a ship or other cargo vessel. In this connection, an object is to provide a self-supporting hatch cover overcoming the above stated problems and meeting the above stated objects, while enabling a quick and easy deployment and removal thereof.

In keeping with an aspect of this invention, a weather proof hatch cover is a fabric, somewhat tent-like structure. The bottom skirt of the structure is secured around the outside of a hatch in a manner which provides a weather proof attachment thereto. The fabric structure rises to an apex which has an opening through which a grain or similar delivery spout may pass. Different embodiments use different techniques for spreading the grain uniformly in the hold under the hatch cover. In one embodiment, ropes attached to the apex of the structure may be lengthened or shortened in order to move the spout. In another embodiment, a plurality of spouts may be provided for simultaneous delivery to different locations under the hatch cover. In yet another embodiment the spout has a length and flexibility under the fabric for independent movement at that location. To make the structure self supporting, it may include inflatable tubes which may be pumped up to form either eaves or rafters, or both.

Figure 2:
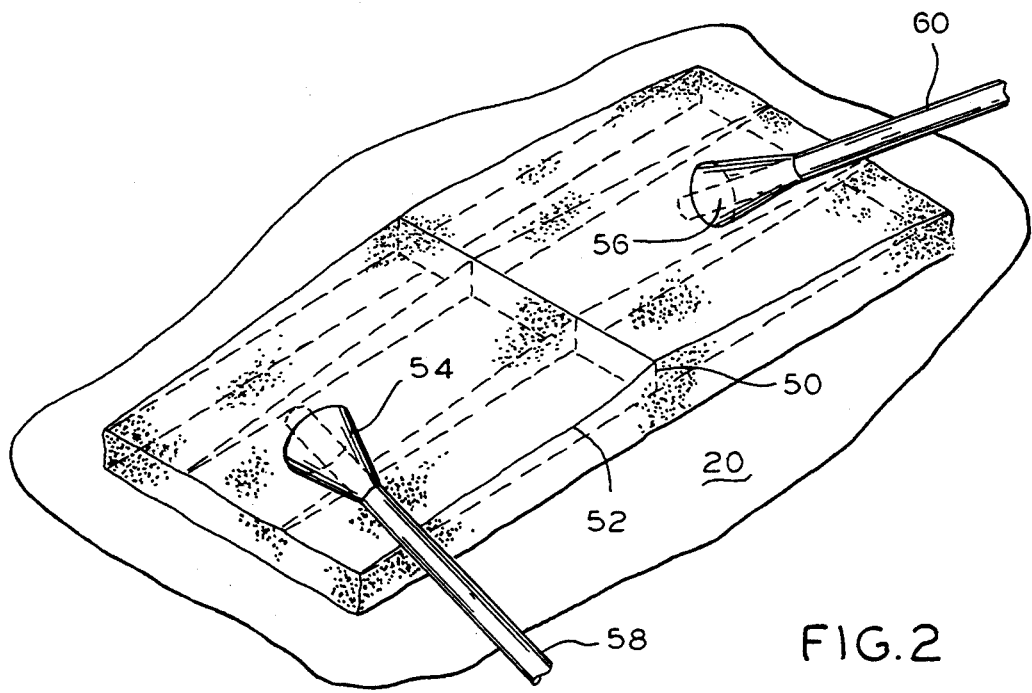

Preferred embodiments of the invention are shown in the attached drawings, wherein:

FIG. 1 schematically illustrates the principle used in one embodiment to move the spout during the loading;

FIG. 2 shows another embodiment wherein a tent-like fabric structure is supported by an aluminum frame over the hatch; and FIG. 3 is a pictorial representation of a hatch cover supported at least in part by inflatable tubes.

FIG. 1 schematically shows a deck 20 of a ship or barge having a hold with a hatch 22 thereon. Conventionally, a hatch is an open top, box-like or fence structure surrounding an opening in a deck or giving access to the interior or the hold of the ship or barge. The top of the hatch is normally closed over by a suitable rigid cover. During loading or unloading, the rigid cover is removed so that cargo may be stored in or removed from the hold. While the cover is so removed, rain, snow, or other matter may enter the hold. Therefore, usually the ship cannot be loaded or unloaded during inclement weather.

As shown in FIG. 1, the somewhat conical skirt 24 of a canvas or other fabric 25 tent-like cover may be attached to the hatch in any weather sealing manner. This attachment may include such things as fitting a rope sewn in the fabric or grommets on the fabric over hooks permanently attached to the hatch or to any other suitable fastener on the hatch. In any event, the skirt of the fabric goes over the hatch opening in a manner such that rain water runs off and onto the deck of the ship, without entering the hold.

The fabric 25 raises to an apex 26 which is attached and sealed in a weather proof manner to grain delivery spout 28 which usually is a permanent part of the dock facilities. This attachment at 26, in effect, creates a tent-like structure with a sloping roof for covering the hatch.

A number of ropes, cable or ties 30-40 extend from a plurality of points around the perimeter of the hatch to the apex 26 and the grain spout. Each of the ropes is tied at its lower end to the deck or hatch in order to stabilize the fabric structure. To adjust the position of the spout, various ropes may be retied in order to vary the length thereof. Therefore, at one time, the spout may be at position 28 and the ropes may be tied off at appropriate lengths as shown by solid lines 30-40. At another time (as shown by dashed lines), the ropes 30-40 may be retied to give them different lengths in order to move the spout to position 42. For example, to make this change of spout position, the rope 30 is loosened and retied to give it the length 44, while rope 40 is shortened and retied to have the length 46. In a similar manner, the lengths of the rest of the ropes 30-40 are adjusted to properly locate the spout. This way, the grain may be uniformly distributed as it is loaded into the ship's hold to be certain that the hatch is properly filled and that the ship remains in proper balance throughout loading.

The grain being fed through the spout 28 (42) may be accompanied by pressurized air so that the air pressure under the fabric 25 is positive relative to the ambient atmospheric pressure. This will cause the fabric to become a self supporting tent-like structure. In this case, it is necessary to exhaust the air from the tent so that the pressurized air entering the tent with the grain delivery does not encounter a resistance from an ever increasing air pressure under the tent. Such an exhaust should have a suitable dust collector 43 for separating the grain dust from the air. Such dust collectors are known. For example, it may have a labyrinth which will not pass particles having the mass and inertia of the dust entrapped in the exhausted air stream.

FIG. 2 shows an aluminum frame 50 which may be assembled from a plurality of pipes. A tent-like fabric structure 52 is stretched over the frame 50, and attached to the hatch in a weather proof manner. The aluminum frame provides a slope to cause rain water to run off the fabric top. Two sleeves 54, 56 are sewn in the fabric. Two grain spouts 58, 60 fit through and are weather sealed to the sleeves. This way, two spouts may simultaneously fill the hold of a ship, thereby both giving uniform distribution of the grain and maintaining the ship's balance.

FIG. 3 shows another embodiment of the invention where a boom 70 extends outwardly from any suitable grain storage facility 72, such as a silo, for example. A ship 76 may be moved under the spout 74 for loading. A grain spout 74 may be moved horizontally on boom 70 and the boom 70 may rotate back and forth, thus allowing the spout to scan over the ship's hold during loading.

A skirt 78 of a fabric structure 79 is attached around a ship's hatch or to the deck 20 which supports the hatch. A fabric, somewhat tent-like, conical superstructure 80 is attached to the structure 79 having skirt 78. An inflatable tube 82 is secured at the eaves of the tent-like structure 80 in order to establish and preserve its perimeter. A swivel ring 84 is joined to the fabric at the apex of the tent-like structure 80. This swivel ring is sealed to spout 74 in a weather proof manner. Inside the tent-like super structure 80, a telescoping spout may continue for a substantial distance so that grain will free fall a controlled distance within the covered hold of the ship. The configuration of the tent-like structure 80 enables a horizontal movement of the spout in order to scan the grain surface.

The fabric 79 and super structure 80 are preferably reinforced by cables 88 which are bonded to or sewn into the fabric in order to help it to preserve its shape. Since the apex of the tent-like structure is attached to and supported by the spout, these cables normally provide all of the support that the fabric requires. However, under some conditions, it may be desirable to provide a more rigid type of roof support. If so, some or all of the lines 88 in FIG. 3 may represent inflatable tubes which provide a rafter like roof support.

While three embodiments have been described and shown in the drawings, it should be understood that their teachings may be combined. For example, the superstructure 80 (FIG. 3) may have a supporting positive internal air pressure as described in connection with FIG. 1. Or the inflatable tube 82 (FIG. 3) may be substituted for the aluminum frame of FIG. 2. Likewise, any of the features of the three embodiments may be combined.

Those who are skilled in the art will readily perceive how to modify the invention. Therefore, the appended claims are to be construed to cover all equivalent structures which fall within the true scope and spirit of the invention.

The claimed invention is:

1. A hatch system for loading particulate matter into a hold, said system comprising a flexible tent-like fabric structure having a skirt with dimensions which fit around and is attached and sealed to a periphery of a hatch associated with said hold, said fabric structure rising with a sloping roof from said skirt to a top, means at said top sealing said fabric to a spout for delivering said particulate matter into said hold, said fabric structure bridging a space between said periphery of said hatch and said spout in order to contain and prevent an escape of dust occurring with a delivery of said particulate matter and to resist entry of precipitation and other foreign matter into said hold whereby said spout may deliver particulate matter into said hold under said fabric, and means for enabling said spout to be moved while the top of said fabric is and remains sealed thereto in order to control a spreading of said particulate matter under said fabric structure without loss of the sealing between fabric and spout.

2. The hatch cover of claim 1 wherein said means for enabling said spout to be moved comprises a plurality of ropes extending from a plurality of points around said periphery of said hatch to said top, whereby said spout may be positioned and repositioned by adjusting lengths of at least some of said ropes.

3. The hatch system of either claim 1 or claim 2 and means for creating a positive air pressure under said fabric structure relative to ambient atmosphere pressure on the outside of said fabric structure, whereby said structure is expanded and supported by said positive air pressure.

4. The hatch system of claim 3 wherein said means for creating a positive air pressure comprises means for delivering air under pressure along with said particulate material through said spout, means for exhausting air from under said fabric structure in order to make way for said air delivered under pressure through said spout, and dust trap means associated with said exhaust means for retaining dust under said fabric structure and for exhausting clean air into the atmosphere.

5. The hatch system of claim 3 and means comprising at least one inflatable tube for, at least in part, supporting said fabric structure.

6. The hatch system of claim 5 wherein said fabric structure has an eave at an elevation above said hatch and said inflatable tube is joined to said fabric at the eave.

7. The hatch system of claim 6 wherein said fabric structure is a generally conical structure with said inflatable tube completely surrounding at least one of a base of the cone structure and said top at an apex of the cone structure.

8. The hatch system of claim 7 and a swivel support ring at said apex, said support ring being sealed to said spout in a weather and dust proof manner.

9. The hatch cover of claim 1 wherein said spout extends far enough through said top and into said fabric structure to enable said spout to be moved vertically and horizontally within said fabric structure in order to scan the area under said fabric structure.

10. A hatch system for loading particulate matter comprising a a flexible fabric structure bridging a space between said hatch and a spout for loading said particulate matter into an area which is accessible via said hatch, said fabric structure having a skirt making a sealed weather and dust proof attachment around a perimeter of hatch, said sealed perimeter containing any dust which occurs during said loading of said particulate matter, a somewhat conical tent-like superstructure rising from an upper portion of said skirt to an apex of said fabric structure, said tent-like structure having eaves surrounding a base of said conical structure, an inflatable tube attached to said fabric in the area of said base for maintaining a shape and form at the base of said tent-like structure, and means at said apex of said conical structure for giving entrance to said spout for delivering said particular matter under said tent-like structure, said apex being sealed to said spout in a weather and dust proof manner which prevents an escape of said dusk.

11. The hatch system of claim 10 and a swivel weather seal between said apex and said spout.

* * * * *